United States Patent
Stensgaard

(12)
(10) Patent No.: US 6,177,630 B1
(45) Date of Patent: Jan. 23, 2001

(54) EQUIPMENT INSTALLATION CONCRETE PAD HAVING INTEGRATED EQUIPOTENTIAL GROUNDING PLANE AND METHOD FOR INSTALLING EQUIPMENT USING SAME

(75) Inventor: John J. Stensgaard, Thornton, CO (US)

(73) Assignee: Qwest Communications International Inc., Denver, CO (US)

(*) Notice: Under 35 U.S.C. 154(b), the term of this patent shall be extended for 0 days.

(21) Appl. No.: 09/173,421

(22) Filed: Oct. 15, 1998

(51) Int. Cl.⁷ .................................................. H02G 13/00
(52) U.S. Cl. .............................. 174/2; 174/5 SG; 174/32; 29/825; 29/898.08; 29/603.04
(58) Field of Search ................... 174/2, 3, 5 R, 174/5 SG, 32, 6, 7, 37, 38, 39, 51; 29/825, 898.08, 603.04

(56) References Cited

U.S. PATENT DOCUMENTS

| | | | |
|---|---|---|---|
| 3,176,193 | * 3/1965 | Sealey | 361/605 |
| 3,731,448 | * 5/1973 | Leo | 52/594 |
| 4,621,476 | * 11/1986 | MacGregor | 174/2 |
| 4,991,248 | * 2/1991 | Allen | 14/73 |
| 5,062,022 | * 10/1991 | Beard et al. | 361/605 |

\* cited by examiner

Primary Examiner—Kristine Kincaid
Assistant Examiner—Adolfo Nino
(74) Attorney, Agent, or Firm—Marsh, Fischmann & Breyfogle LLP

(57) ABSTRACT

An electrical and electronic equipment installation pad includes a precast concrete support slab 40 having an electrically conductive pathway disposed therein. The pathway may be comprised of a plurality of steel reinforcing rods 42 welded to one another to form a grid 44. Coil loop inserts 46 disposed within the slab 40 and welded to the grid 44 receive electrically conductive bolts for securing the equipment 20 on the slab 40. Galvanized inserts 48, 50 having bolts 52, 54 extending therefrom are also disposed within the slab 40 and welded to the grid 44. Ground rod leads 34 from ground rods 36 installed in the ground proximate to the pad 10 are connected to the galvanized inserts 48, 50 providing a path for fault currents from the equipment 20 through the grid 44 to ground. The pad 10 may be used to install equipment 20 at a desired location by first securing the equipment 20 on the pad 10 while the pad 10 is at a location remote from the desired location and then moving the pad 10 to the desired location. Ground rod leads 34 from ground rods 36 installed in the ground proximate to the pad 10 are then connected with the galvanized inserts 48, 50 to ground the equipment 20.

19 Claims, 3 Drawing Sheets

EQUIPMENT INSTALLATION CONCRETE PAD HAVING INTEGRATED EQUIPOTENTIAL GROUNDING PLANE AND METHOD FOR INSTALLING EQUIPMENT USING SAME

FIELD OF THE INVENTION

The present invention relates to grounding of electrical and electronic equipment and, more particularly, is concerned with an electrical and electronic equipment installation pad having an integrated grounding plane and a method of using such a pad to install electrical and electronic equipment at a desired location.

BACKGROUND OF THE INVENTION

The importance of adequately grounding electrical and electronic equipment, such as wireless communication equipment, to protect both the equipment and technicians working on the equipment is well known. This is particularly true where the equipment is installed at a desired location, such as on a hilltop, susceptible to frequent lightning strikes.

Traditionally, wireless communication equipment is installed at a desired location in the following manner. Concrete is transported to the installation site and a concrete support pad is poured. The equipment is separately transported to the site and secured on the support pad. To ground the equipment, a trench is dug around the pad, typically to a depth of two and one-half feet, and a ground ring formed from a heavy gauge wire, such as a #2 wire, is installed in the trench. Ground rods are sunk into the ground adjacent to the ground ring and connected thereto. A wire connected to the equipment runs over the surface of the support pad to electrically connect the equipment with the ground ring.

SUMMARY OF THE INVENTION

The present invention is directed to an electrical and electronic equipment installation pad and method for installing electrical and electronic equipment at a desired location. According to one aspect of the invention, the electrical and electronic equipment installation pad includes a support pad for supporting the equipment thereon. An electrically conductive pathway is disposed within the support pad. The electrically conductive pathway within the support pad is connectable to both the equipment and to ground.

According to another aspect of the invention, there is at least one first electrically conductive insert disposed at least partially within the support pad. The first insert is electrically connected with the electrically conductive pathway and is adapted to establish an electrical connection between the equipment and the electrically conductive pathway. There is also at least one second electrically conductive insert disposed at least partially within the support pad. The second insert is also electrically connected with the electrically conductive pathway and is adapted to establish an electrical connection between the electrically conductive pathway and ground.

According to a further aspect of the invention, the support pad is a precast concrete slab. The electrically conductive pathway disposed within the slab is comprised of a plurality of steel reinforcing rods welded to one another to form a grid.

According to a still further aspect of the present invention, the first insert is a coil loop insert welded in at least one place to the steel grid. The first insert is capable of receiving an electrically conductive bolt for securing the equipment on the support pad.

According to yet another aspect of the present invention, the second insert is a galvanized insert welded in at least one place to the steel grid. The second insert includes at least one threaded bolt extending therefrom. An electrical lead from a ground device, such as a ground rod, disposed in the ground proximate to the installation pad may be connected to the second insert using the bolt.

One more aspect of the present invention is a method of installing electrical and electronic equipment at a desired location. The method involves providing a movable support pad with an electrically conductive pathway disposed therein. The equipment is secured on the support pad such that it is electrically connected with the electrically conductive pathway. This is done while the support pad is in a location remote from the desired location. The support pad with the equipment secured thereon is then moved to the desired location. At least one grounding device installed at the desired location is then electrically connected with the electrically conductive pathway of the equipment installation pad.

These and other aspects and advantages of the present invention should become apparent from a review of the following detailed description when taken in conjunction with the accompanying figures.

DETAILED DESCRIPTION

Figure 1:
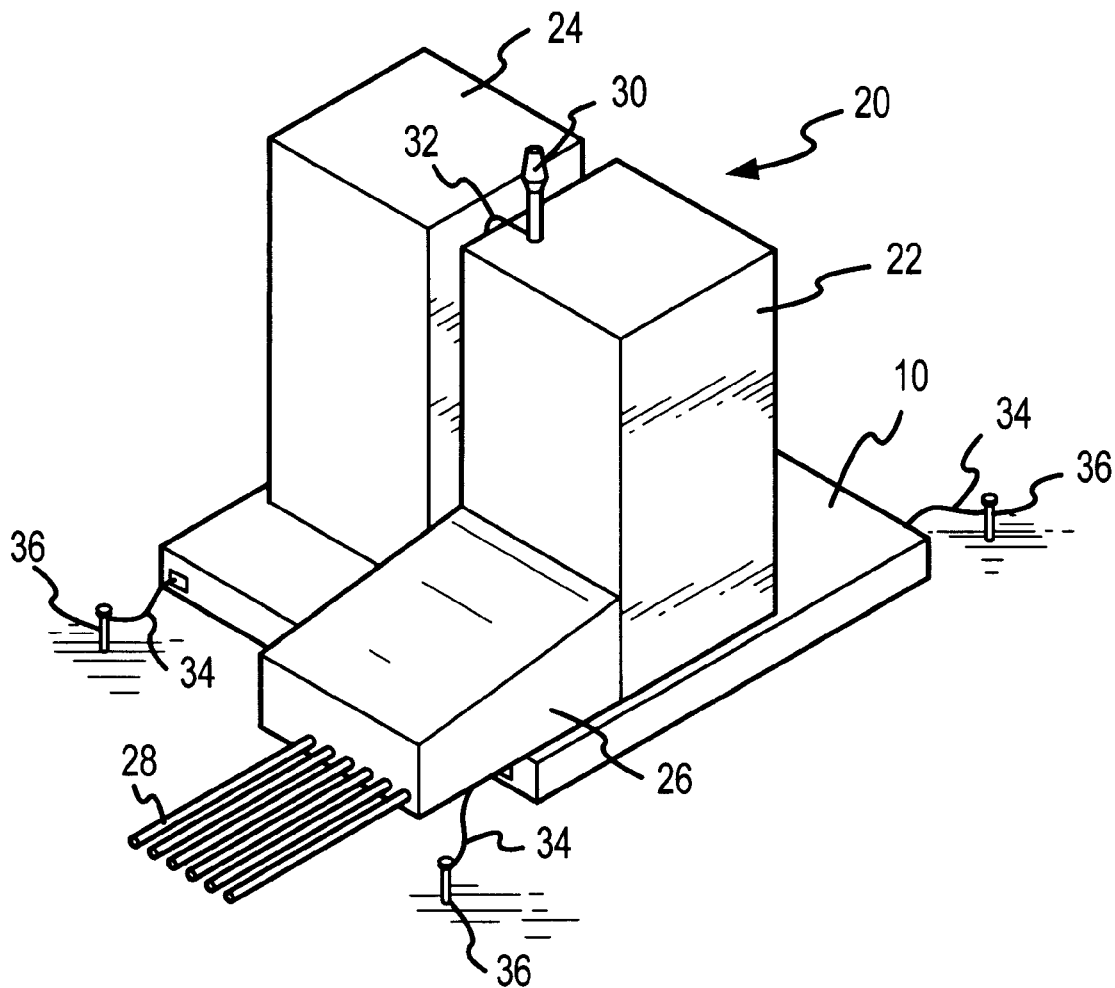
FIG. 1 illustrates a perspective view of one embodiment of an equipment installation pad in accordance with the present invention having wireless communication equipment installed thereon.

Referring to FIG. 1, there is shown one embodiment of an equipment installation pad 10 of the present invention with exemplary electrical and electronic equipment 20 installed thereon. In this instance, the electrical and electronic equipment 20 is typical of the equipment installed at a remote station for providing wireless communications. However, those skilled in the art will appreciate that the equipment installation pad 10 of the present invention is suitable for use with various electrical and electronic equipment. The equipment 20 shown in FIG. 1 comprises a wireless communications equipment cabinet 22, a power supply cabinet 24, a coaxial cable cover assembly 26, a plurality of coaxial cables 28 connected at one end with the communications equipment cabinet 22, a global positioning system (GPS) antenna 30, and an antenna lead 32 connecting the GPS antenna 30 to the communications equipment cabinet 22. A plurality of ground rod leads 34 electrically connect the equipment installation pad 10 to a plurality of ground rods 36 disposed substantially in the ground and proximate to the equipment installation pad 10.

Figure 2:
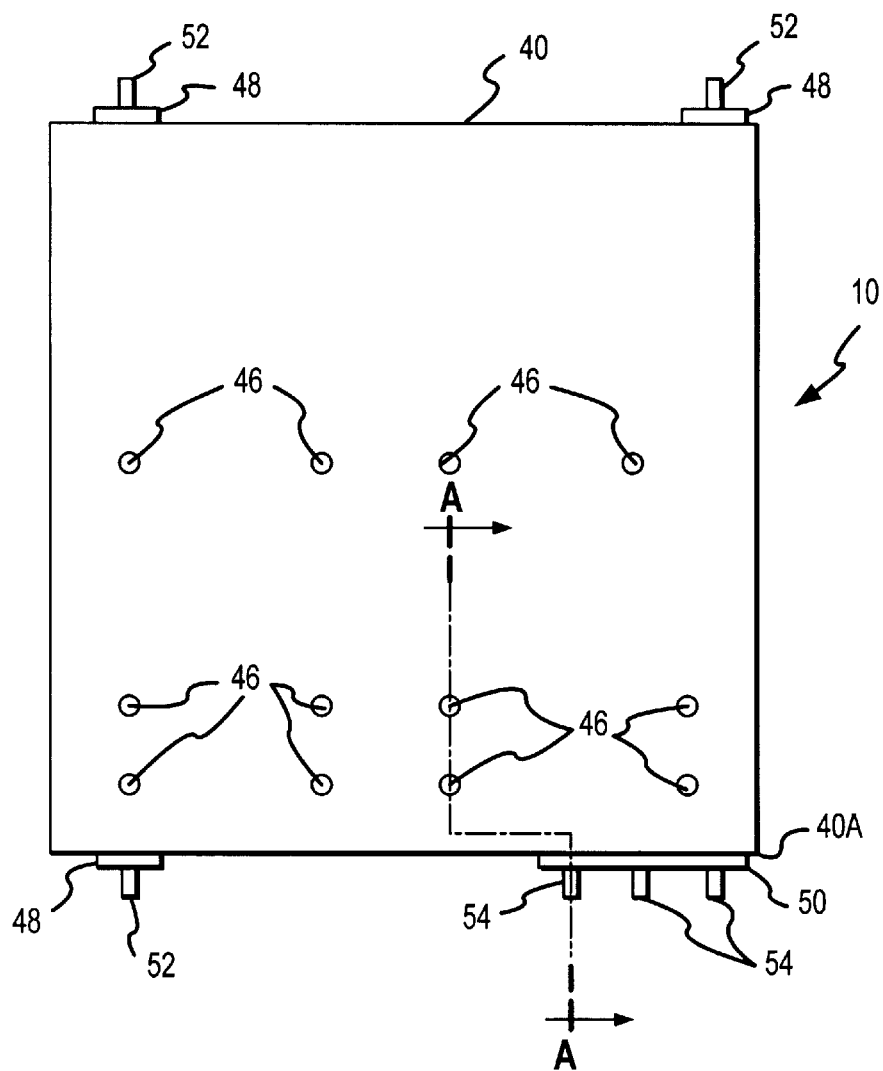
FIG. 2 illustrates a top view of the equipment installation pad of FIG. 1.
Figure 3:
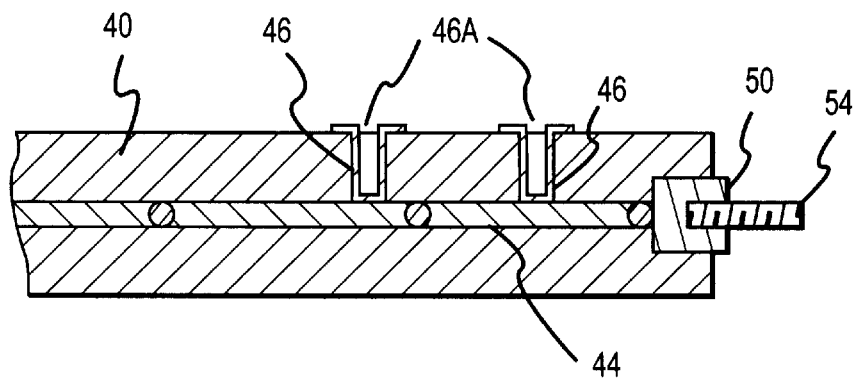
FIG. 3 illustrates a cross-sectional view of the equipment installation pad taken along line A—A in FIG. 2.
Figure 4:
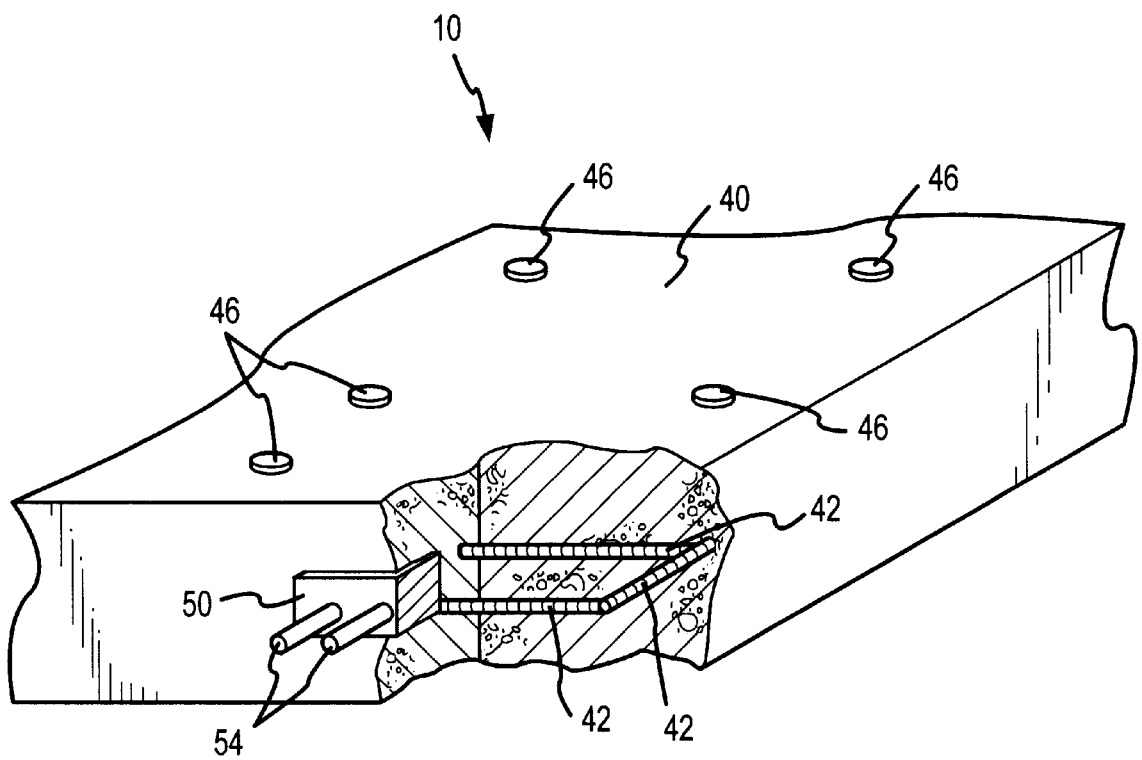
FIG. 4 illustrates a partial perspective view of the equipment installation pad with a corner of the support pad in partial cut-away view to show the steel grid disposed therein.

Referring now to FIGS. 2–4, the equipment installation pad 10 includes a precast concrete support slab 40. For the typical equipment 20 shown installed thereon, the concrete support slab 40 should be rectangularly shaped, approximately six inches thick, and have a minimum support strength of 4,000 p.s.i. However, depending upon the nature of the equipment for which the equipment installation pad 10 is intended, other configurations, thicknesses and minimum support strengths for the concrete support slab 40 may be acceptable. Disposed within the support slab 40 are a plurality of steel reinforcing rods 42. The steel reinforcing rods 42 are welded to one another to form a grid 44 that functions as an electrically conductive pathway within the support slab 40. A plurality of electrically conductive coil loop inserts 46 are at least partially disposed within the support slab 40. Each coil loop insert 46 is disposed within the support slab such that an open end 46A thereof is at or above the upper surface of the support slab 40. Each coil loop insert 46 is welded in at least one place to the grid 44 formed by the steel reinforcing rods 42. The coil loop inserts 46 receive electrically conductive bolts (not shown) that secure the electrical and electronic equipment 20 on the upper surface of the support slab 40. When the equipment 20 is secured on the upper surface of the support slab 40 with electrically conductive bolts, the coil loop inserts 46 provide an electrical connection between the equipment 20 and the grid 44. Although numerous other arrangements are possible, in this embodiment there are twelve coil loop inserts 46 arranged in an appropriate manner, as shown in FIG. 2, for securing the wireless communications equipment cabinet 22, the power supply cabinet 24, and the coaxial cable cover assembly 26 on the support slab as depicted in FIG. 1.

A plurality of galvanized inserts 48, 50 are also disposed at least partially within the support slab 40. Each of the galvanized inserts 48, 50 is welded in at least one place to the grid 44 providing an electrical connection between the galvanized inserts 48, 50 and the grid 44. Although other configurations are possible, in this embodiment there are four galvanized inserts 48, 50, each one being disposed such that it partially extends from a side of the support slab 40 and is adjacent to a separate corner of the support slab 40. Three of the galvanized inserts 48 include one threaded bolt 52 extending therefrom and are welded in one place to the grid 44. Although other sizes are suitable as well, each of the three galvanized inserts 48 is approximately six inches long and the threaded bolts 52 extending therefrom are one inch in length with a one-half inch diameter. As shown in FIG. 1, the coaxial cable cover assembly 26 is secured on the support slab 40 nearest one corner 40A of the support slab 40. The galvanized insert 50 nearest the corner 40A of the support slab 40 is welded to the grid 44 in three places and includes three threaded bolts 54 extending therefrom. Preferably, the galvanized insert 50 is approximately eighteen inches long and the bolts are one-half inch in diameter by two inches long, although other sizes are also suitable. The bolts 52, 54 are for connecting the ground rod leads 34 from the ground rods 36 to the galvanized inserts 48, 50 so that the grid 44 is thereby electrically connected to ground. Nuts (not shown) threadably engageable on the bolts 52, 54 may be used to retain the ground rod leads 34 on the bolts 52, 54.

In addition to providing an electrical connection between the ground rod leads 34 and the grid 44, each of the galvanized inserts 48, 50 may serve as attachment points when moving the equipment installation pad 10. The galvanized inserts 48, 50 and their corresponding bolts 52, 54 are sufficiently strong to be utilized in lifting the equipment installation pad 10 with the equipment 20 installed thereon, securing the pad 10 during transport, and lowering pad 10 to place it and the equipment 20 installed thereon at a desired location.

When the equipment 20 is secured on the support slab 40 and the ground rod leads 34 from the ground rods 36 are connected to the galvanized inserts 48, 50, the equipment installation pad 10 of the present invention provides an electrical path for fault current from the equipment 20 to ground wherein the grid 44 functions as an equipotential grounding plane. This eliminates the need for installing a ground ring about the support pad 40 to which the ground rods 36 are connected.

The equipment installation pad 10 of the present invention may be used in the following manner to easily install electrical and electronic equipment 20 at a desired location. Instead of transporting concrete to the desired installation site and pouring a concrete pad there, the equipment installation pad 10 is fabricated at a pad fabrication facility remote from the installation site. The equipment 20 is then secured on the equipment installation pad 10 provided by the pad fabrication facility while such pad 10 is at a location remote from the desired installation site. The equipment 20 is secured using electrically conductive bolts receivable in the coil loop inserts 46 so that the equipment is electrically connected with the grid 44 inside the precast concrete slab 40. The equipment installation pad 10 with the equipment 20 secured thereon is then moved to the desired installation location. Attachment points provided by the galvanized inserts 48, 50 are particularly useful while moving the pad 10. The pad 10 with the equipment 20 secured thereon is placed at the desired installation site and ground rods 36 are installed in the ground proximate to the pad 10. Since this embodiment has six bolts 52, 54 extending from the galvanized inserts 48, 50 for attaching ground rod leads 34 thereto, six ground rods 36 (one for each bolt 52, 54) are installed proximate to the pad 10. Alternatively, the ground rods 36 may be installed prior to placing the pad 10 at the desired site. The electrical leads 34 from the ground rods 36 are then connected with the galvanized inserts 48, 50 using the bolts 52, 54 and appropriate nuts thereby providing a path for fault currents from the equipment 20 through the grid 44 of the equipment installation pad 10 to ground.

In addition to moving a pad 10 with appropriate equipment 20 previously secured thereon to the installation location, the equipment installation pad 10 of the present invention may be separately moved to the installation site and connected to ground rods 36 installed at the site. Equipment 20 separately moved to the site may be secured on the support slab 40 and electrically connected with the grid 44. Also, because the equipment 20 is easily secured on the support slab 40 and electrically connected with the grid 44 by bolts received in the coil loop inserts 46, equipment 20 that is outdated, no longer functioning, or otherwise not useful can easily be removed from the installation pad 10 and replaced, if necessary, with other equipment 20. Furthermore, if it becomes necessary to move the equipment 20 to a different location, this can easily be accomplished by disconnecting the ground rod leads 34 and moving the pad 10 with the equipment 20 installed thereon to the new location.

The foregoing description of the present invention has been provided for purposes of illustration and description. This description is not intended to limit the invention and various modalities thereof. Variations, embodiments and modifications may be apparent to those skilled in the art and are intended to be within the scope of the following claims.

What is claimed is:

1. An equipment installation pad for supporting electrical and electronic equipment and providing an electrical pathway between the equipment and ground, said equipment installation pad comprising:

a support pad for supporting the equipment on an upper surface thereof;

an electrically conductive pathway disposed within said support pad, wherein said electrically conductive pathway is electrically connectable to the equipment and to ground;

at least one first electrically conductive insert disposed at least partially within said support pad and electrically connected with said electrically conductive pathway, said first insert being adapted to establish an electrical connection between the equipment and said electrically conductive pathway; and at least one second electrically conductive insert disposed at least partially within said support pad and electrically connected with said electrically conductive pathway, said second insert being adapted to establish an electrical connection between said electrically conductive pathway and ground.

2. The equipment installation pad of claim 1 wherein said support pad is a precast concrete slab.

3. The equipment installation pad of claim 1 wherein said first insert is capable of receiving an electrically conductive connector for securing the equipment on said upper surface of said support pad.

4. The equipment installation pad of claim 1 wherein said electrically conductive pathway is a grid comprised of a plurality of steel reinforcing rods welded to one another to form said grid and said first electrically conductive insert is a coil loop insert capable of receiving an electrically conductive bolt, said coil loop insert being welded in at least one place to said grid.

5. The equipment installation pad of claim 1 wherein said electrically conductive pathway is a grid comprised of a plurality of steel reinforcing rods welded to one another to form said grid and said second insert is a galvanized insert having at least one threaded bolt extending therefrom for connecting thereto an electrical lead extending from the ground, said galvanized insert being welded in at least one place to said grid.

6. The equipment installation pad of claim 1 wherein said second insert is of sufficient strength in order to provide an attachment point for use in lifting and moving said equipment installation pad.

7. The equipment installation pad of claim 1 wherein the connection to ground is made through at least one grounding rod disposed proximate to the equipment installation pad.

8. An equipment installation pad for supporting electrical and electronic equipment and providing an electrical pathway between the equipment and a plurality of grounding rods, said equipment installation pad comprising:

a concrete slab for supporting the equipment thereon having a plurality of steel reinforcing rods disposed therein, said steel reinforcing rods being welded to one another to form a steel grid;

a plurality of electrically conductive coil loop inserts for receiving electrically conductive bolts used to secure the equipment on said concrete slab, each said coil loop insert being disposed at least partially within said concrete slab and welded to said steel grid in at least one place such that an electrical pathway is provided between the equipment and said steel grid when the equipment is secured on said concrete slab with said bolts; and a plurality of electrically conductive galvanized inserts each having at least one electrically conductive bolt extending therefrom for electrically connecting a separate one of the grounding rods thereto, each said galvanized insert being disposed at least partially within said concrete slab and welded to said steel grid in at least one place such that an electrical pathway is provided between said steel grid and the grounding rod electrically connected thereto.

9. The equipment installation pad of claim 8 wherein there are twelve of said coil loop inserts arranged in a pattern suitable for securing, on said concrete slab, the equipment comprised of a wireless communications cabinet, a power supply cabinet and a cable cover assembly.

10. The equipment installation pad of claim 8 wherein said concrete slab is rectangular and said plurality of electrically conductive galvanized inserts are actually four galvanized inserts, three of which each have only one bolt extending therefrom and are welded to said steel grid in only one place and one of which has three bolts extending therefrom and is welded in three places to said steel grid, each said galvanized insert being located adjacent to a separate corner of said concrete slab.

11. The equipment installation pad of claim 8 wherein said plurality of electrically conductive galvanized inserts are of sufficient strength in order to provide attachment points for use in lifting and moving said equipment installation pad.

12. A method of installing electrical and electronic equipment at a desired installation site comprising the steps of:

providing a movable concrete support pad having an upper surface for supporting the equipment thereon and a reinforcing structure disposed therein that provides an electrically conductive pathway within said support pad;

securing the equipment on said upper surface of said support pad while said support pad is in a location remote from the desired installation site, the equipment being secured such that the equipment is electrically connected with said electrically conductive pathway;

moving said support pad with the equipment secured thereon to the desired installation site;

installing at least one grounding device substantially in the ground at the desired installation site; and electrically connecting said grounding device with said electrically conductive pathway.

13. The method of claim 12 wherein in said step of providing, said movable concrete support pad provided also includes at least one first electrically conductive insert electrically connected to said electrically conductive pathway for receiving an electrically conductive connector used to secure the equipment on said upper surface of said concrete support pad, and in said step of securing, the equipment is electrically connected with said electrically conductive pathway by receipt of said connector in said first insert.

14. The method of claim 13 wherein in said step of providing, said movable concrete support pad provided also includes at least one second electrically conductive insert electrically connected to said electrically conductive pathway, and in said step of electrically connecting, said grounding device is electrically connected to said electrically conductive pathway by electrically connecting said grounding device to said second insert.

15. The method of claim 14 wherein in said step of providing, said concrete support pad provided includes four of said second inserts, and in said step of moving, said four second inserts serve as attachment points.

16. A method of grounding electrical and electronic equipment installable at a desired installation site comprising the steps of:

securing the equipment on a concrete support pad having a reinforcing structure disposed therein that provides an electrically conductive pathway within said support pad;

electrically connecting the equipment with said electrically conductive pathway; and electrically connecting said electrically conductive pathway with at least one grounding device disposed substantially in the ground at the desired installation site.

17. The method of claim 16 wherein said concrete support pad includes at least one first electrically conductive insert for receiving an electrically conductive connector, said first insert being electrically connected with said electrically conductive pathway, and said steps of securing the equipment on said concrete support pad and electrically connecting the equipment with said electrically conductive pathway are accomplished by receipt of said connect or in said first insert.

18. The method of claim 17 wherein said concrete support pad includes at least one second electrically conductive insert electrically connected with said electrically conductive pathway and said step of electrically connecting said grounding device with said electrically conductive pathway is accomplished by electrically connecting said grounding device with said second insert.

19. The method of claim 16 wherein said concrete support pad is moveable, the step of securing the equipment on said concrete support pad is completed while said concrete support pad is at a location remote from the desired installation site, and said method further includes, prior to said step of electrically connecting said grounding device with said electrically conductive pathway, the step of moving said concrete support pad with the equipment secured thereon to the desired installation site.

* * * * *